United States Patent
Knopp et al.

(10) Patent No.: US 11,489,586 B2
(45) Date of Patent: Nov. 1, 2022

(54) METHOD FOR OPERATING A COMMUNICATION SYSTEM

(71) Applicant: UNIVERSITÄT DER BUNDESWEHR MÜNCHEN, Neubiberg (DE)

(72) Inventors: Andreas Knopp, Neubiberg (DE); Thomas Delamotte, Neubiberg (DE); Christian Hofmann, Neubiberg (DE); Robert Schwarz, Neubiberg (DE); Kai-Uwe Storek, Neubiberg (DE)

(73) Assignee: NEOSAT GMBH, Neubiberg (DE)

( * ) Notice: Subject to any disclaimer, the term of this patent is extended or adjusted under 35 U.S.C. 154(b) by 161 days.

(21) Appl. No.: 16/755,228

(22) PCT Filed: Nov. 12, 2018

(86) PCT No.: PCT/EP2018/080989
§ 371 (c)(1),
(2) Date: Apr. 10, 2020

(87) PCT Pub. No.: WO2019/092259
PCT Pub. Date: May 16, 2019

(65) Prior Publication Data
US 2020/0322044 A1    Oct. 8, 2020

(30) Foreign Application Priority Data

Nov. 13, 2017  (EP) .................................. 17201369
Dec. 22, 2017  (EP) .................................. 17210202

(51) Int. Cl.
*H04B 7/185*    (2006.01)
*H04B 7/0413*   (2017.01)

(52) U.S. Cl.
CPC ....... *H04B 7/18517* (2013.01); *H04B 7/0413* (2013.01)

(58) Field of Classification Search
CPC .......................... H04B 7/18517; H04B 7/0413
See application file for complete search history.

(56) References Cited

U.S. PATENT DOCUMENTS

| | | | |
|---|---|---|---|
| 2008/0291864 A1* | 11/2008 | Chang | H04B 7/1851 370/316 |
| 2015/0188623 A1* | 7/2015 | Angeletti | H04B 7/2041 455/13.3 |

(Continued)

FOREIGN PATENT DOCUMENTS

| WO | WO 2014/001837 | 1/2014 | |
|---|---|---|---|
| WO | WO-2014001837 A1 * | 1/2014 | ........... H04B 7/2041 |

OTHER PUBLICATIONS

"Fair User Grouping for Multibeam Satellites with MU-MIMO Precoding"; Storek et al.; GLOBECOM 2017—2017 IEEE Global Communications Conference; Dec. 4-8, 2017 (Year: 2017).*

(Continued)

*Primary Examiner* — Benjamin H Elliott, IV
(74) *Attorney, Agent, or Firm* — Dority & Manning, P.A.

(57) ABSTRACT

The invention relates to a method for operating a communication system, the communication system comprising at least two separate transmitting antennas located on Earth and at least two receive antennas located with a distance from Earth, the receive antennas having directional receiving patterns which cover a common region on Earth, the method comprising the following steps: —precoding the symbol sequences before transmission from the transmitting antennas to the receive antennas in order to reduce spatial interference between the symbol sequences, and —simultaneously transmitting symbol sequences from the transmitting antennas to the receive antennas by spatial and frequency multiplexing in a time and phase synchronized fashion, the symbol sequences being transmitted from different transmitting antennas being different from each other (Continued)

Figure 1:
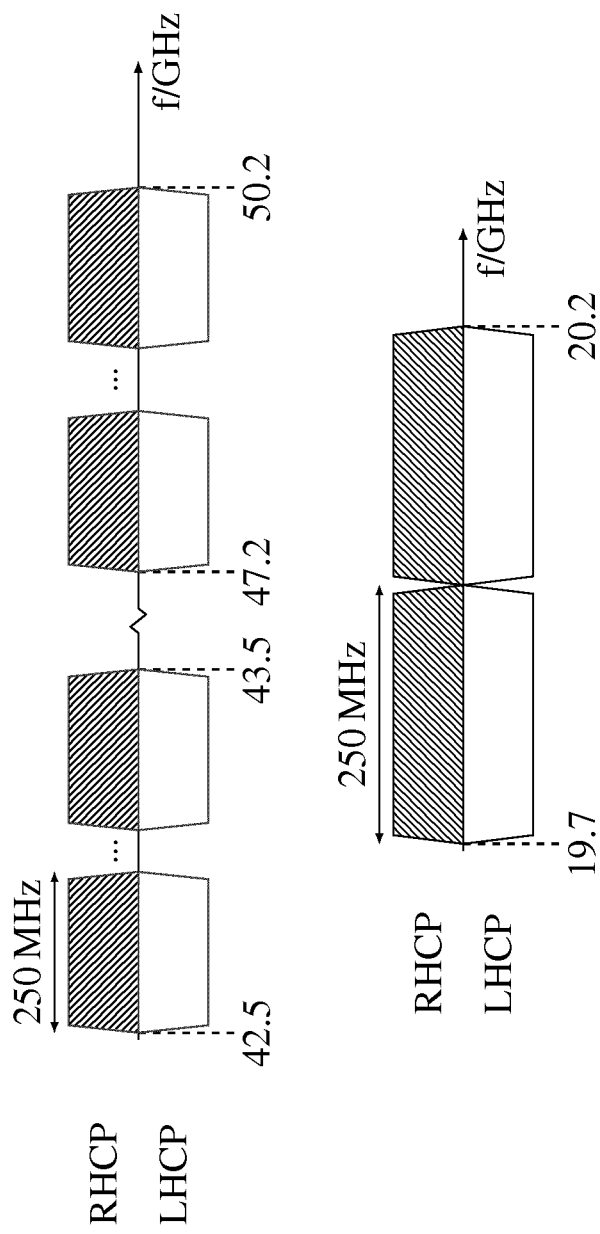

but being transmitted on the same frequency. In this way, a high bandwidth method for transmitting data from an Earth transmitting station to a receiving station which is located with a distance from Earth.

15 Claims, 4 Drawing Sheets

(56) References Cited

U.S. PATENT DOCUMENTS

| | | | |
|---|---|---|---|
| 2016/0261334 A1* | 9/2016 | Kim | H04B 7/18513 |
| 2017/0085329 A1* | 3/2017 | Ravishankar | H04B 7/2125 |
| 2017/0149493 A1* | 5/2017 | Arapoglou | H04B 7/0626 |
| 2018/0076867 A1* | 3/2018 | Murakami | H04B 1/0096 |
| 2018/0191428 A1* | 7/2018 | Hemmati | H04B 7/19 |
| 2018/0205447 A1* | 7/2018 | Buer | H04B 7/18508 |
| 2018/0279133 A1* | 9/2018 | Gayrard | H04B 7/026 |
| 2019/0222301 A1* | 7/2019 | Knopp | H04B 17/336 |
| 2020/0028575 A1* | 1/2020 | Buer | H04B 7/2125 |
| 2020/0229203 A1* | 7/2020 | Hiramatsu | H04B 7/155 |
| 2020/0322044 A1* | 10/2020 | Knopp | H04B 7/18517 |

OTHER PUBLICATIONS

"On the prospects of MIMO for Satellite Communications"; Schwarz et al.; 6th International Multi-Conference on Systems, Signals and Devices, 2009. SSD '09; Apr. 2009 (Year: 2009).*

"Spatial MIMO over Satellite: A Proof of Concept"; Hofmann et al.; IEEE ICC 2016 SAC Satellite and Space Communications; May 22-27, 2016 (Year: 2016).*

"Impact of the Atmosphere on the Signal Phase and the Channel Capacity in EHF MIMO Satellite Links"; Storek et al.; 2015 IEEE Global Communications Conference (GLOBECOM); Dec. 6-10, 2015 (Year: 2015).*

PCT International Search Report and Written Opinion for corresponding PCT Application No. PCT/EP2018/080989, dated Feb. 5, 2019, 10 pages.

* cited by examiner

METHOD FOR OPERATING A COMMUNICATION SYSTEM

PRIORITY CLAIM

The present application is a 371 of International Application No. PCT/EP2018/080989, titled "Method for Operating a Communication System, filed on Nov. 12, 2018, which claims the benefit of priority of European Patent Application Serial No. 17201369.0 filed on Nov. 13, 2017 and European Patent Application Serial No. 17210202.2 filed on Dec. 22, 2017, which are incorporated herein in its entirety by reference.

The growing demand for higher data rates in broadband fixed satellite services (FSS) systems has driven the development of high throughput satellite high throughput satellite (HTS) systems for fixed satellite services (FSS) in the past decades. With the deployment of geographically separated user beams, where frequency bands can be reused, capacities up to 1 Tbit/s per satellite are considered to be achievable for 2020 (e.g. ViaSat 3). Although a common assumption is that HTS systems are mainly of interest for rural areas with low population densities, recent figures of HTS operators like ViaSat or EUTELSAT show the opposite development: Broadband services via satellite are primarily booked by users in densely populated areas. Such services are thus in direct competition with terrestrial optical fiber networks, and new solutions have to be designed to maintain the profitability of HTS systems.

The advent of 5G will further aggravate this problem in the near future. Nowadays, the limited frequency resources available in the Ka-band is the main bottleneck for an additional increase of the data rates. As a consequence, shifting the feeder links to higher frequency bands like the Q/V-band (40/50 GHz) is foreseen to be a key technological evolution. In that way, the whole Ka-band spectrum is freed up for the user links.

The resort to a larger number of small, highly focused beams to increase the frequency re-use among the user beams is also a major trend. This optimization of the frequency resources provides a linear system capacity growth, but strongly constrains the design of the feeder links. Since the aggregate user link bandwidth can reach up to several hundreds of GHz, tens of feeder beams with a full frequency re-use are necessary to supply the required uplink bandwidth. Moreover, system designers are faced with significant link budget limitations due to the strong rain attenuations that can be observed in the Q/V-band. In order to overcome this challenge, gateway diversity schemes have been proposed to ensure a sufficient availability of the system. Most of the solutions allow, nevertheless, the activation of only one gateway per feeder beam: If a gateway is in outage, the data traffic is re-routed to another one with better channel conditions.

It is the object of the invention to provide a high bandwidth method for transmitting data from an Earth transmitting station to a receiving station which is located with a distance from Earth.

This object is addressed by the subject matter of claim 1. Preferred embodiments of the invention are described in the sub claims.

Therefore, according to the invention, a method for operating a communication system is provided, the communication system comprising at least two separate transmitting antennas located on Earth and at least two receive antennas located with a distance from Earth, the receive antennas having directional receiving patterns which cover a common region on Earth in which the at least two separate transmitting antennas are located, the method comprising the following steps:
  precoding the symbol sequences before transmission from the transmitting antennas to the receive antennas in order to reduce spatial interference between the symbol sequences, and
  simultaneously transmitting symbol sequences from the transmitting antennas to the receive antennas by spatial and frequency multiplexing in a time and phase synchronized fashion, the symbol sequences being transmitted from different transmitting antennas being different from each other but being transmitted on the same frequency.

As already mentioned above, feeder links constitute a bottleneck in the design of HTS systems for fixed satellite services (FSS). To support the total user link bandwidth, tens of feeder beams must be deployed. Moreover, the resort to higher frequency bands (Q/V-band) requires the development of gateway diversity schemes to cope with rain fades. This leads to a further increase of the number of ground stations necessary to ensure the system availability. Therefore, the HTS system architecture according to the present invention which comprises a cooperative gateway diversity strategy is proposed to address these challenges. According to the invention, a MIMO line-of-sight (LOS) feeder link is established. Exploiting spatial multiplexing and diversity gains, an improvement of the achievable rates as well as robustness against weather impairments can be realized.

According to the invention, at least two separate transmitting antennas located on Earth are provided. In the context of the present invention, the term "separate antennas" refers to antennas which are not part of the same ground station, i.e. are not part of the same ground station construction but belong to ground station constructions which are different and locally separated from another. In this respect, it is preferred that the transmitting antennas are located on Earth on a respective fixed position, the fixed positions being separated from each other by a distance of at least 1 km, more preferably 10 km, and even more preferably 50 km. Of course, the maximum distance of the two separate transmitting antennas is given by such a distance that these antennas, despite the curvature of the Earth, are still simultaneously "seen" by the at least two receive antennas which are located with a distance from Earth.

Further, according to the invention, the receive antennas have directional receiving patterns which cover a common region on Earth. Therefore, in general, the receive antennas could have the same directional receiving patterns. However, this is not mandatory for the invention which only requires that the at least two separate transmitting antennas are located in the region on Earth which is commonly covered by the receive antennas. If the receive antennas additionally cover further regions which go beyond this common region this is of no relevance for the present invention.

According to a preferred embodiment of the invention, the method further comprises the following step:
  converting the symbol sequences received by the receive antennas from a respective uplink frequency channel to a downlink frequency channel and forwarding the symbol sequences on the downlink frequency channel. According to this preferred embodiment of the invention, the system at the location of the receive antennas may simply act as a transparent transmitter, i.e. without processing the symbol sequences except for the conversion to the downlink frequency.

Alternatively, according to a preferred embodiment of the invention, the method further comprises the following steps:
processing the symbol sequences after receipt at the receive antennas in order to reduce spatial interference between the symbol sequences, and
converting the processed symbol sequences from a respective uplink frequency channel to a downlink frequency channel and forwarding the symbol sequences on the downlink frequency channel.

According to a preferred embodiment of the invention, the symbol sequences from the receive antennas are transmitted to multiple ground receivers on Earth. Preferably, the ground receivers are not connected with each other. In this respect, it is further preferred that at least a part of the ground receivers forms a MIMO system. This may be a single MIMO system. However, it is also possible that multiple MIMO systems are formed which are separate from each other, e.g. with the help of a four colour frequency re-use scheme.

Further, according to a preferred embodiment of the invention, the method comprises the following steps:
generating a number of K independent symbol sequences such that for a given instant of time the symbols from all symbol sequences form a vector of length K, and
multiplicating the vector with a precoding matrix such that linear combinations of the symbols of the vector are assigned to a specific transmitting antenna and to a specific uplink frequency channel of the respective transmitting antenna.

In this respect, preferably an uplink is considered where the available bandwidth is at least 1 GHz. For Q/V/W-band systems it may go up to 5 GHz bandwidth. To transmit the data streams, the available bandwidth is segmented into channels of smaller bandwidth, preferably in the order of some tens or hundreds of MHz. In each of these channels, MIMO is used to realize spatial multiplexing. The rate that can be supported in a MIMO link for a given uplink frequency channel depends on the carrier frequency, i.e. the center frequency of every channel. To address this issue, it is proposed to use a precoding approach where the data streams are spread across the uplink frequency channels. In this way, the uplink channel quality may become equal for all data streams. At the place of the two receive antennas located with a distance from Earth, the processing allows to reconstruct the data streams before sending them in the downlink.

According to this embodiment of the invention, it is further preferred that the method comprises the following step:
multiplicating the vector with a precoding matrix such that the linear combinations of the symbols of the vector are distributed among all uplink frequency channels of the transmitting antennas.

Further, according to a preferred embodiment of the invention, the transmit antennas are inter-connected with each other via a central processing unit which supervises the generation of the symbol sequences which are to be transmitted to the receive antennas.

Preferably, the receive antennas are satellite based, and preferably based on a single satellite in space. However, according to another preferred embodiment of the invention, the receive antennas are provided on multiple collocated satellites. In this way, the antennas on the different satellites may act together in one common MIMO system. Preferably, these multiple collocated satellites are located in a common area in space the dimension of which is maximum 75 km×75 km×35 km.

Alternatively, according to a preferred embodiment of the invention, the receive antennas are located on a high-altitude platform station.

According to a preferred embodiment of the invention, the method comprises the following step:
precoding the symbol sequences before transmission from the transmitting antennas to the receive antennas in order to improve robustness against atmospheric impairments.

According to a preferred embodiment of the invention, the method comprises the following step:
switching to a diversity mode when at least one antenna suffers from a too strong rain fade.

Thus, the approach based on the synchronized use of gateways in the same feeder beam is extended according to the present invention to a multiple-input-multiple-output (MIMO) configuration. A MIMO solution has the potential to provide a linear scaling of the link capacity with the minimum of the numbers of inputs and outputs. In terrestrial networks, MIMO systems can generally take advantage of a large scattering environment. On the contrary, the presence of directive antennas in the feeder links of HTS systems leads to predominant LOS components in the propagation channel. A MIMO LOS channel is thus obtained, and a high capacity system can be realized.

For a satellite equipped with two spatially separated reflector antennas, the inter-antenna distance on Earth to reach high capacity is preferably in the order of a few tens of kilometers. The positioning depends especially on the carrier frequency. Compared to conventional gateway diversity schemes, spatial multiplexing may be exploited to reach higher data rate per feeder beam. In this way, the necessary number of feeder links may be reduced, and a larger angular separation between them may be achieved to minimize the inter-beam interference. As afore-mentioned, a simultaneous and synchronized operation of the gateways is proposed to realize a MIMO feeder link. Since the proposed approach also offers the possibility to be operated in a diversity mode, the setup is also called a cooperative smart gateway architecture.

According to the present invention, symbol streams intended to fixed and not-cooperating single antenna receivers in the user links share common time and frequency resources in the feeder link when a spatial multiplexing mode is used. A satellite may play the role of a multiuser multiple-input-multiple-output (MU-MIMO) relay. For the considered MIMO feeder link, the transmit processing, also known as precoding, is preferably designed under per-antenna power constraints. The positioning of the gateways tens of kilometers apart indeed necessitates that the transmit antennas are equipped with their own high power amplifiers (HPAs). Moreover, the channel from the satellite to the end users simply consists of a set of parallel and independent single-input-single-output (SISO) channels. Preferably, a four colour frequency re-use scheme is used to avoid interference between adjacent user beams.

These and other aspects of the invention will be apparent from and elucidated with reference to the embodiments described hereinafter. Such an embodiment does not necessarily represent the full scope of the invention, however, and reference is made therefore to the claims and herein for interpreting the scope of the invention.

Figure 2:
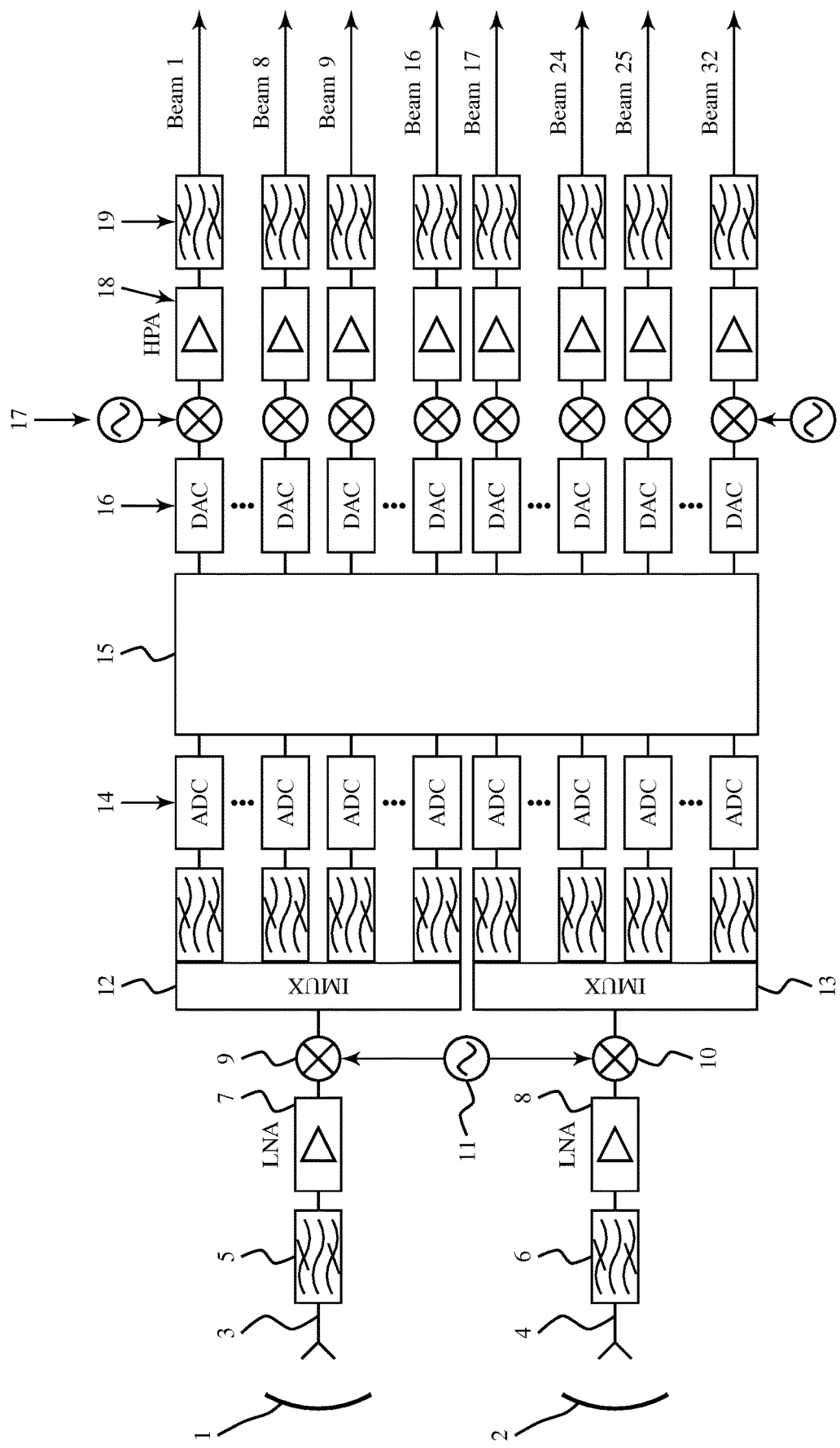
Figure 3:
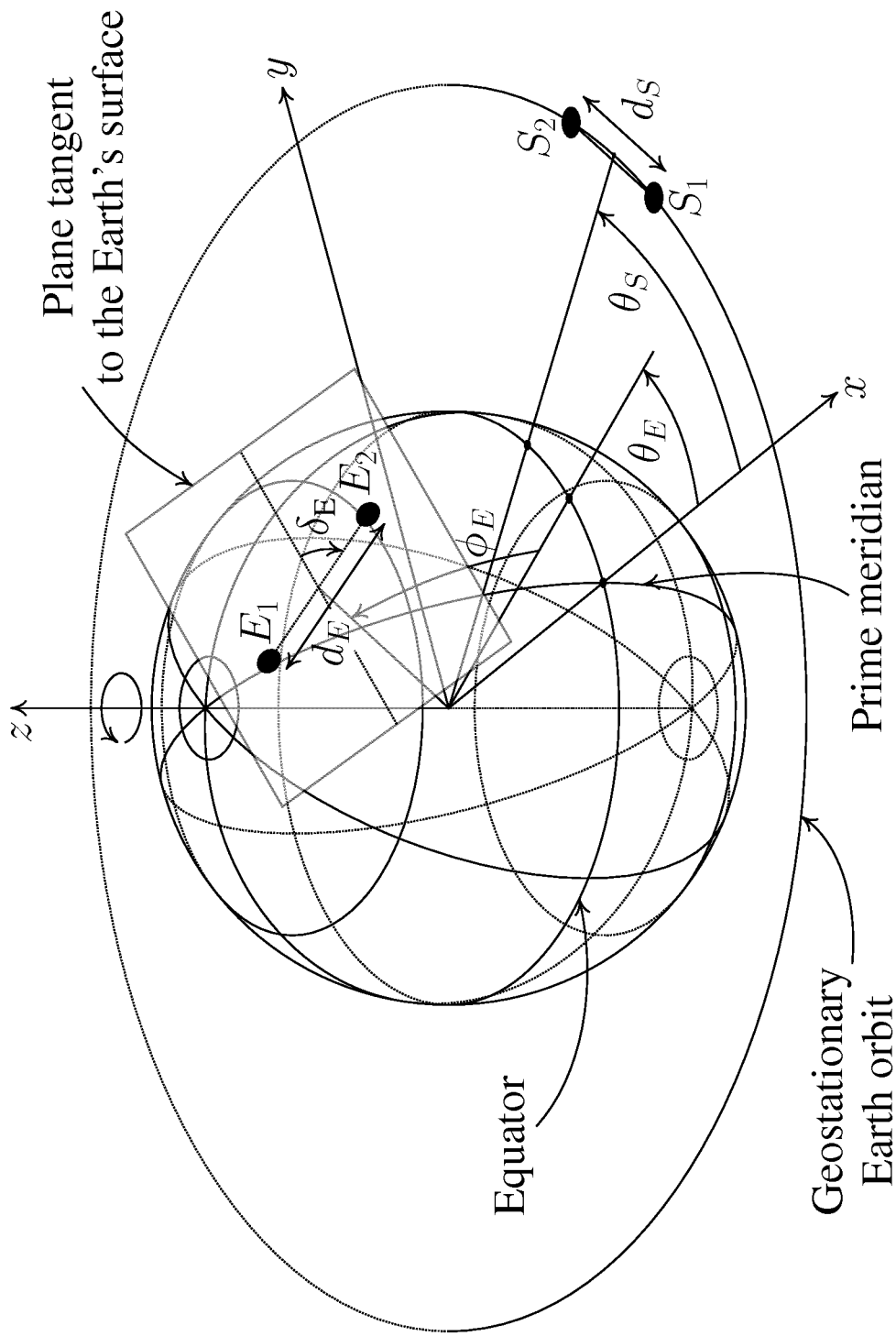
Figure 4:
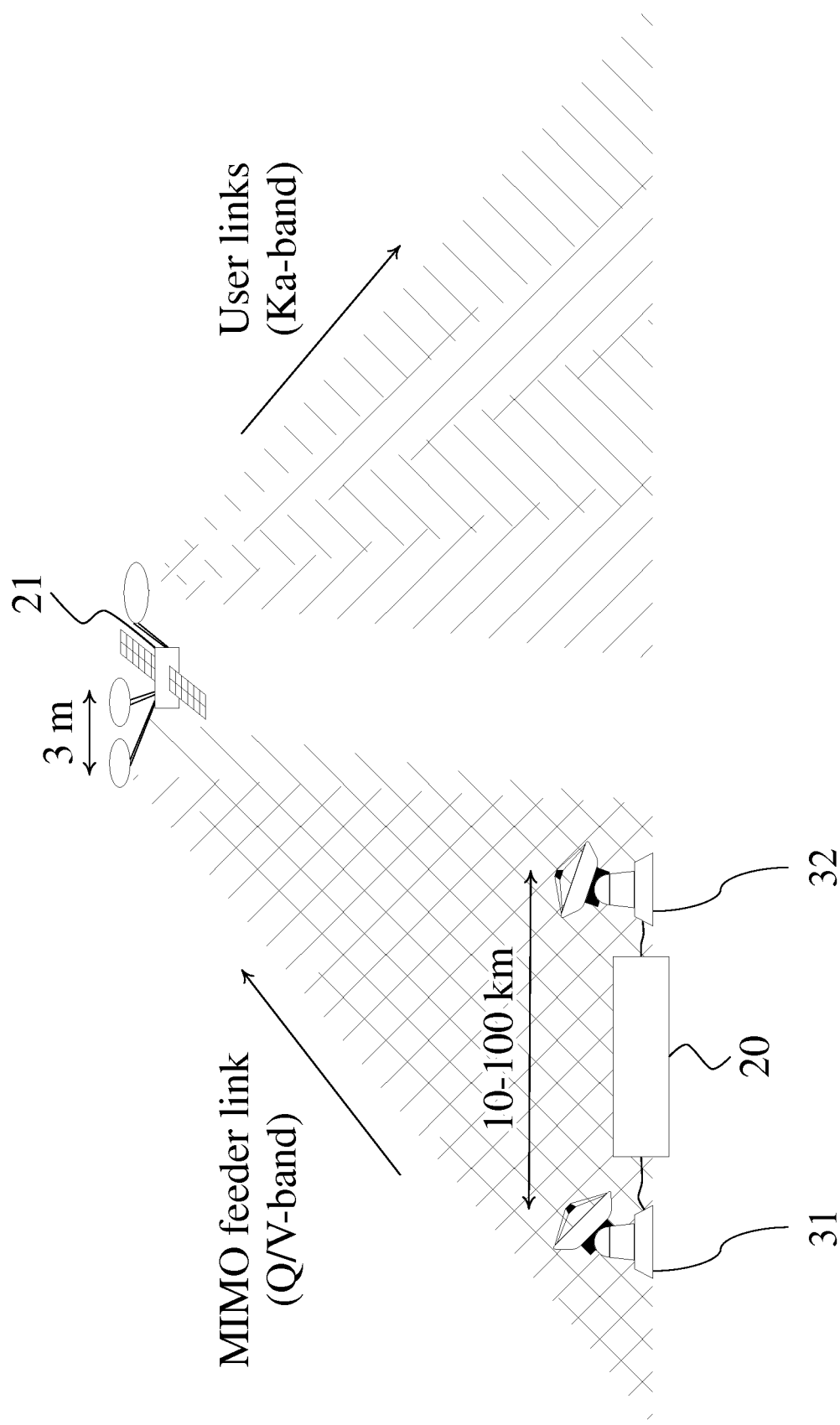

In the drawings:

FIG. 1 schematically depicts a frequency plan for the feeder link (above) and a frequency plan for the user links (below) according to a preferred embodiment of the invention, FIG. 2 schematically depicts a digital satellite payload according to a preferred embodiment of the invention, FIG. 3 schematically depicts the parametric characterization of the antennas positions in the feeder link according to a preferred embodiment of the invention, and FIG. 4 schematically depicts the system architecture of system according to a preferred embodiment of the invention.

In the context of the present invention, matrices and vectors are denoted by capital and lower case boldface letters, respectively. $(\bullet)^T$ and $(\bullet)^H$ represent the transpose and the Hermitian transpose of a matrix. The K×K identity matrix is denoted by $I_K$. $\|\bullet\|_2$ and $\|\bullet\|_F$ are the 2-norm (Euclidean norm) of a vector and the Frobenius norm of a matrix. The trace of a square matrix is computed with the operator Tr($\bullet$), whereas its n-th diagonal element is obtained with $[\bullet]_{n,n}$. A diagonal or block-diagonal matrix can be constructed with the operator diag($\bullet$), whose inputs correspond to the desired diagonal elements. The vector $x_k$ represents the k-th column of the matrix X. Furthermore, the expectation of a random variable is given by the function $\mathbb{R}(\bullet)$. Finally, Re ($\bullet$) returns the real part of a complex number.

In the following, the HTS system architecture with a cooperative smart gateway diversity according to a preferred embodiment of the invention is presented together with the equivalent baseband model. The MIMO LOS channel matrix is especially introduced.

The considered scenario according to a the preferred embodiment depicted in FIG. 4 is based on the use of a HTS 21 placed in a geostationary orbit (GEO) though the invention may also be used with MEO and/or LEO satellites. Since, in the GEO case, the satellite 21 appears to be fixed in the sky, the distances between the gateways and the satellite do not change over time. A geostationary satellite actually experiences orbit perturbations. Periodic corrections are necessary to maintain the satellite 21 within a so-called station-keeping box, whose typical dimensions are 75 km×75 km×35 km. However, for fixed transmit and receive antenna spacings, shifting the satellite 21 by this order of magnitude has a minor impact on the amplitude and phase relationships between the impinging signals. For the present consideration, these orbital displacements are ignored.

The Earth portion of the MIMO feeder link consists of two gateways 31, 32 separated by several kilometers (10 km to 100 km). These gateways 31, 32 are inter-connected via a central processing unit 20 as depicted in FIG. 4. To ensure the feasibility of MIMO precoding, time and phase synchronization of these gateways 31, 32 have to be realized. RF-over-fiber transport can be used for this purpose. This technology has been applied, in particular, at the NASA deep space network (DSN). In this system, antennas separated by more than 10 km are synchronized for deep space communications, tracking and navigation functions or ground-based astronomical radar imaging operations. Using the same type of technological solution, accurate and cost-effective time and phase synchronization of the gateways 31, 32 are achievable.

In the satellite 21, two antennas are positioned 3 meters apart and constitute the receive array of the MIMO feeder link. To operate this link, a total bandwidth of 4 GHz per polarization state in the bands 42.5-43.5 GHz and 47.2-50.2 GHz is exploited. The satellite receive antennas cover the same geographical region centered in the middle of the gateway array. Their beamwidth is sufficiently large such that depointing losses remain small.

The satellite payload is assumed to rely on an architecture supporting digital transparent processing (DTP), known as "digital bent-pipe". DTP is a form of on-board processing (OBP) where a sampled version of the signals is accessed to perform tasks such as the flexible filtering of the traffic channels for routing purposes or the predistortion of HPA nonlinearities. This approach offers a compromise between a fully transparent architecture and a more complex regenerative payload. It is nowadays the favored solution in the satellite industry. In the context of the proposed HTS system with MIMO feeder link, the digital processing capabilities of the satellite are used to apply non-regenerative MIMO processing.

Lastly, the downlink part of the HTS system is made of a set of Ka-band user beams that deliver different data contents to fixed single antenna receivers. Each of these beams is generated by a single feed element. It corresponds to a single feed per beam (SFPB) configuration. This latter implies a lower payload complexity than a multi-feed per beam (MFPB) architecture where a beam forming network (BFN) is required to produce the feed signals. The number of beams that can be supported by the feeder link depends on the available bandwidth per beam. Here, a four colour frequency reuse scheme is considered where two polarization states and two carrier frequencies are used to avoid interference between neighboring beams. With a total downlink bandwidth of 500 MHz in the band 19.7-20.2 GHz, four channels of W=250 MHz can be allocated to the beams. The user equipments can process a bandwidth of 250 MHz such that one user per beam is served within a time slot. In practice, some interference between the user beams exists due to the presence of side lobes in the antenna radiation patterns. Meanwhile, in the present model, this interference is assumed to be negligible.

With the proposed MIMO feeder link, a total of K=2×4/0.25=32 user beams can be supported for a given uplink polarization. To this end, a segmentation of the uplink bandwidth into K/2=16 frequency channels of 250 MHz combined with the resort to spatial multiplexing is considered. A possible frequency plan is schematically depicted in FIG. 1 for the feeder link (above) for the user links (below) where a right-handed circular polarization (RHCP) is used in the uplink. With the left-handed circular polarization (LHCP), 16 additive uplink channels would be available bringing the total number of supported user beams to 64. However, only one uplink polarization is sufficient to assess the system performance. A digital satellite payload according to a preferred embodiment of the invention, complying with the previous system dimensioning is schematically depicted in FIG. 2. The different bandpass filters relate to the different uplink and downlink channels of the frequency plan from FIG. 1.

As depicted in FIG. 2, the satellite payload is equipped with two spatially separated receive reflector antennas 1, 2. For each of them, a RF chain is used to isolate the desired receive signals before their digitalization. These RF chains consist of the following building components:

A receive feed collecting the incoming radio waves 3, 4.

A band-pass filter 5, 6 followed by a low noise amplification 7, 8 delivering an amplified signal in the frequency band of interest. It aims at ensuring a sufficient robustness against the noise contribution added by other components in the payload (e.g. frequency mixer).

A down-conversion to an intermediate frequency 9, 10. The frequency mixers are driven by a common local oscillator 11.

An input multiplexer 12 dividing the considered frequency band into the different subchannels exploited through frequency division multiplexing.

Once the different frequency channels for both receive chains have been isolated, analog-to-digital converters 14 perform a digitalization of the signals. These digital signals are then provided to a digital signal processor 15 to mitigate channel impairments such as, for example, spatial interference. Finally, the processed signals are converted back to the analog domain using digital-to-analog converters 16. Transmit RF chains are in charge of forwarding the signals to the downlink beams. They contain the following equipments:

Frequency up-converters to the downlink frequencies 17.

High power amplifiers 18 ensuring a sufficient signal power in the downlink.

Band-pass filters 19 mitigating undesired out-of-band radiations

As already mentioned, MIMO processing in the gateways and in the satellite is envisioned to enable the multiplexing of the K=32 users signals into the K/2=16 uplink frequency channels. In the following, the baseband system model required to design the MIMO strategies is detailed. First, a deterministic model of the K×K MIMO uplink channel is provided.

The MIMO feeder link channel is represented in the equivalent baseband using the following block diagonal structure $$H=\text{diag}\{H^{(1)}, \ldots, H^{(K/2)}\}. \quad (1)$$

With this model, the fragmentation of the uplink bandwidth into K/2 not-interfering frequency channels and the resort to the MIMO approach in each of them is taken into account. The matrix $H^{(l)} \in \mathbb{C}^{N_S \times N_E}$, where $N_S=2$ and $N_E=2$ are the number of antennas in the satellite and on Earth, stands for the MIMO link at the l-th uplink carrier frequency $f_c^{(l)}$, $1 \leq l \leq K/2$. Each of its entries $h_{mn}^{(l)}$, m, n$\in\{1, 2\}$, corresponds to the channel coefficient from the n-th gateway to the m-th satellite antenna. For the considered scenario, this matrix $H^{(l)}$ is expressed as $$H^{(l)} = \sqrt{\frac{G_{Tx}^{(l)} G_{Rx}^{(l)}}{k_B T_S W}} \cdot \begin{bmatrix} \tilde{h}_{11}^{(l)} & \tilde{h}_{12}^{(l)} \\ \tilde{h}_{21}^{(l)} & \tilde{h}_{22}^{(l)} \end{bmatrix} \cdot \begin{bmatrix} \alpha_1^{(l)} & 0 \\ 0 & \alpha_2^{(l)} \end{bmatrix} = \sqrt{\frac{G_{Tx}^{(l)} G_{Rx}^{(l)}}{k_B T_S W}} \cdot \tilde{H}^{(l)} \cdot D^{(l)}, \quad (2)$$

where $G_{Tx}^{(l)}$ and $G_{Rx}^{(l)}$ are the transmit and receive antenna gains, $k_B$ is the Boltzmann constant and $T_S$ is the system noise temperature of the satellite payload. The normalization with the square root of the uplink noise power $k_B T_S W$ is done such that a unit variance uplink noise contribution can be used in the model of the transmission chain. The matrix $\tilde{H}^{(l)} \in \mathbb{C}^{N_S \times N_E}$ is the MIMO LOS channel matrix that models the free space propagation, and $D^{(l)} \in \mathbb{C}^{N_S \times N_E}$ is a diagonal matrix of the atmospheric impairments experienced by the gateways. The structures of these two matrices are now thoroughly described.

Free space propagation: The closed-form expression for the coefficients $\tilde{h}_{mn}^{(l)}$ of the matrix $\tilde{H}^{(l)}$ requires the knowledge of the position of the gateway and satellite antennas. To this end, the antenna locations are defined in FIG. 3 using an Earth centered, Earth fixed (ECEF) coordinate system (parametric characterization of the antennas positions in the feeder link). FIG. 4 schematically depicts the system architecture of system according to this preferred embodiment of the invention.

For the sake of simplicity, the distance between the Earth's center and any point on its surface is set equal to the Earth's mean radius $R_E$=6,378.1 km. Besides, since the two gateways are separated by a distance of only 10 km to 100 km, the Earth's curvature is neglected. The gateways are thus represented in a plane tangent to the Earth's surface at the point equidistant from these two stations. The orientation $\delta_E$ characterizes the angle between the east-west direction and the antenna array. The latitude $\phi_E$ and the longitude $\theta_E$ specifying the center of the gateway array as well as the inter-antenna distance $d_E$ then allow to fully characterize the position of the ground antennas.

At the satellite side, the two receive antennas are considered to be both positioned in the equatorial plane. In that way, the longitude $\theta_S$ of the center of the antenna array together with the inter-antenna distance $d_S$ and the geostationary orbit radius $R_S$=42,164.2 km provide a thorough description of the satellite antenna positions.

Based on the previous parametric characterization, the distance $r_{mn}$, m, n$\in\{1, 2\}$, between the n-th gateway antenna and the m-th satellite antenna can be determined. The free space propagation coefficients write as $$\tilde{h}_{mn}^{(l)} = a_{mn}^{(l)} \cdot e^{-j\frac{2\pi f_c^{(l)} r_{mn}}{c_0}}, \quad (3)$$

with $c_0$, the speed of light, and $a_{mn}^{(l)} = c_0/(4\pi f_c^{(l)} r_{mn})$.

The considered MIMO LOS channel model is only valid under the assumption that the channel bandwidth is significantly smaller than the carrier frequency. This condition will, however, be always fulfilled in the present satellite communication scenario since carrier frequencies on the order of several tens of GHz are used, whereas the allocated bandwidth per channel usually does not exceed a few tens or hundreds of MHz.

It is noted that, because of the large distance between the transmit and receive arrays, the amplitude loss coefficients for a given frequency $f_c^{(l)}$ are quasi-equal, i.e. an $a_{mn}^{(l)} \approx a^{(l)}$. Even though the inter-antenna distances are computed using a simplified coordinate system, the ability of the model to accurately render the relative phase relationships of the impinging signals has been verified by channel measurements. A condition on these phase relationships must be fulfilled to obtain a maximum capacity channel. It implies in practice an optimization of the antenna positioning. The gateway spacing required for a given carrier frequency can be determined using a closed-form solution. In the considered system architecture, 7.45 GHz separate the lowest and the highest uplink carrier frequencies such that the optimum antenna spacings at these frequencies differ by more than 5 km. Meanwhile, the resilience of the phase relationships to imperfections of the antenna positioning allows to find a range of spacings where close to maximum data rates can be achieved in all uplink frequency channels. Preferred spacings are around 40 km.

Atmospheric impairments: The signals transmitted from the gateways are affected by atmospheric phenomena. In the Q/V-band, the main radiowave propagation impairments are originating from the troposphere and include attenuation effects as well as phase disturbances. The attenuation distortions comprise gaseous absorption (water vapour and oxygen), cloud and rain attenuations along with scintillations. Among these effects, rain attenuation is the most severe and can entail losses higher than 10 dB. This impairment imposes strong constraints on the link budget. It has motivated the development of gateway diversity schemes to ensure system availability. In the sequel, the assumption is made that rain attenuation is the only weather impairment affecting the receive power in the feeder link. The other types of fading effects can be compensated by an uplink power control in the gateways. Concerning the phase disturbances, entailed by refraction and random scattering, their impact on the achievable system performance is negligible. In this configuration, antennas on Earth are separated by a few meters, and the inter-antenna distance in the geostationary orbit is on the order of hundreds of kilometers. The separation in the troposphere between neighboring signal paths then reaches several meters, whereas it is less than 1 cm in the present scenario. Hence, phase shifts suffered by adjacent paths are guaranteed to be quasi-identical for the considered MIMO feeder link. As a matter of fact, it is reasonable to model a common attenuation and phase shift for signal paths stemming from the same gateway. The atmospheric impairments at frequency $f_c^{(l)}$ for the n-th gateway are expressed as $$\alpha_n^{(l)} = |\alpha_n^{(l)}| \cdot e^{-j\xi_n^{(l)}}, \quad (4)$$

where $|\alpha_n^{(l)}| \in ]0, 1]$ and $\xi_n^{(l)} \in [-\pi, \pi[$ represent the amplitude fading and the phase shift suffered by the signals, respectively. In the following, the dependency of the fading coefficients $|\alpha_n^{(l)}|$ on the carrier frequency will be omitted to simplify the analysis of the system robustness against rain attenuation. It comes down to implicitly assuming that a power margin compensates the differences between the rain attenuation values in the uplink frequency channels. The ITU-R prediction model shows that the attenuation exceeded for 1% of an average year at 50 GHz is approximately 1.25 dB higher than at 42.5 GHz for typical European weather conditions and elevation angles. The difference increases to around 3 dB for the thresholds observed for 0.1% of an average year. As a consequence, it is used $|\alpha_n^{(l)}| = |\alpha_n|$, $1 \leq l \leq K/2$, and the rain attenuation in dB for the n-th gateway is obtained as $A_n = -20 \cdot \log_{10}(|\alpha_n|)$. The probability that different gateways experience similar fades decreases when their separation $d_E$ is increased. A large enough distance between the gateways thus limits the risk of simultaneous strong rain fade events, i.e. of having large values for both $A_1$ and $A_2$.

Baseband system model: In the following, the equivalent baseband model of the MIMO system is described. Let $s = [s_1, \ldots, s_K]^T \in \mathbb{C}^{K \times 1}$ be the vector of data symbols to be transmitted in a given time slot to K non-cooperative end users, where $s_k$ is the symbol for the k-th user. These symbols are chosen from a phase-shift keying (PSK) or amplitude and phase-shift keying (APSK) constellation $S$ using the adaptive coding and modulation (ACM) functionality of the DVB-S2X standard. They have unit variance, and are uncorrelated such that $\mathbb{E}[ss^H] = I_K$. In the central processing unit of the gateways, a linear transformation of the data vector s is performed using a precoding matrix $B \in \mathbb{C}^{K \times K}$. The vector of symbols sent in the feeder link writes as $$x = [x_1, \ldots, x_K]^T = Bs. \quad (5)$$

The design of the matrix B must ensure that the power transmitted by a gateway in each frequency channel does not exceed a given value. The gateways are indeed equipped with their own HPAs such that the sum available power cannot be flexibly allocated between the transmit antennas. Moreover, power flux density threshold limits are imposed by regulatory authorities to avoid undesirable interference to other networks operating in the same frequency band. To mathematically formulate the per-gateway and per-carrier power constraint, the following partitioning of the precoder is introduced $$B = \begin{bmatrix} B^{(1)} \\ \vdots \\ B^{(K/2)} \end{bmatrix}. \quad (6)$$

The matrix $B^{(l)} \in \mathbb{C}^{2 \times K}$ is the part of the precoding matrix which maps the content of the vector s to the inputs of the MIMO channel at carrier frequency $f_c^{(l)}$. Denoting $P_u^{(l)}$ the maximum transmit power per gateway in the l-th channel, the condition that must be fulfilled is given by $$[(B^{(l)}B^{(l)H}]_{n,n} \leq P_u^{(l)}, n = 1, 2. \quad (7)$$

After the transmission over the MIMO feeder link, the receive symbols in the satellite payload are modeled as $$y = [y_1, \ldots, y_K]^T = Hx + \eta_u, \quad (8)$$

with $\eta_u = [\eta_{u,1}, \ldots, \eta_{u,K}]^T$ a vector of unit variance circularly-symmetric complex Gaussian noise whose autocorrelation matrix writes as $\mathbb{E}[\eta_u \eta_u^H] = I_K$. This uplink noise is uncorrelated with the data symbols. For the characterization of the feeder link quality, the maximum receive uplink carrier to noise ratios (CNRs) is defined as $$CNR_{u,n}^{(l)} = \frac{P_u^{(l)}}{N_S} \sum_{m=1}^{N_S} |h_{mn}^{(l)}|^2, \, n = 1, 2, 1 \leq l \leq K/2. \quad (9)$$

The digital processing and the signal amplification in the satellite are represented by the relay matrix $G \in \mathbb{C}^{K \times K}$. For the sake of notational convenience, it is decomposed into the following form $$G = WA. \quad (10)$$

The matrix $W \in \mathbb{C}^{K \times K}$ stands for the linear transformation performed in the on-board processor such that the vector of symbols available at its output is given by $$z = [z_1, \ldots, z_K]^T = W^H y = W^H Hx + W^H \eta_u. \quad (11)$$

The symbol $z_k$ is the symbol intended for the k-th user beam. At the payload output, the diagonal matrix $\Lambda \in \mathbb{R}^{K \times K}$ models the amplification from the HPAs. Its entries $\lambda_{kk}$, $1 \leq k \leq K$, are determined to ensure that, for each downlink beam, the transmit power is equal to $P_d$. In other words, the elements of the vector of downlink transmit symbols $t = [t_1, \ldots, t_K]^T = \Lambda z$ fulfill the condition $$\mathbb{E}[|t_k|^2] = g_k^H R_y g_k = \lambda_{kk}^2 \cdot w_k^H R_y w_k = P_d, \quad (12)$$

with $R_y = HBB^H H^H + I_K$ the autocorrelation matrix of y. This per-beam power constraint is related to the use of a SFPB architecture where each feed element is connected to its own HPA. In the downlink, the Ka-band user links are modeled through the diagonal matrix $F \in \mathbb{C}^{K \times K}$. Its k-th diagonal element $f_{kk}$ is the channel coefficient between the k-th feed and the active user in the beam it generates. This coefficient takes the antenna gains, the free space path loss and the atmospheric impairments into account. Similarly to the uplink channel coefficients, a normalization with the square root of the downlink noise power is also included such that the noise contribution can be modeled in the equivalent baseband using a stochastic process with unit variance. At the user side, the vector r of output symbols is given by $$r = [r_1, \ldots, r_K]^T = FG^H Hx + FG^H \eta_u + \eta_d. \quad (13)$$

The vector $\eta_d=[\eta_{d,1}, \ldots, \eta_{d,K}]^T$ is the vector of unit variance downlink circularly-symmetric complex Gaussian noise. This noise is uncorrelated with both the data symbols s and the uplink noise $\eta_u$.

The quality of the user links is characterized with the receive downlink CNRs. For the k-th user, this CNR is defined as $$CNR_{d,k}=P_d \cdot |f_{kk}|^2. \tag{14}$$

Forward link design: Based on the model introduced before, different approaches for the computation of the precoding and on-board processing matrices are proposed. Here, a perfect channel state information (CSI) is assumed to be available in the processing unit of the gateways. A centralized determination of the system parameters is hence performed in this unit. The on-board processing matrix is then forwarded to the satellite. The complexity issues and communication overheads are less critical than for terrestrial communications due to the slow variation of the channel over time. Whereas terrestrial solutions generally require updates for each transmit block, a MIMO satellite system can use the same parameters over a longer period of time. In the sequel, a zero-forcing of the uplink MIMO channel is first envisioned. Afterwards, more advanced designs aiming at a maximization of either the product or the minimum of the uplink carrier to interference plus noise ratios (CINRs) are considered.

Precoding: A square MIMO channel matrix with full rank can be inverted by resorting to the zero-forcing (ZF) criterion either at the transmitter or the receiver. It is known to offer good performance when the noise impairment is limited which is the case for a feeder link with a proper link budget. Here, the channel inversion is performed in the gateways. To realize this, the precoder is decomposed into a ZF matrix $B_{zf} \in \mathbb{C}^{K \times K}$ and a K×K permutation matrix $\Pi$ such that $$B=B_{zf}\Pi. \tag{15}$$

The permutation matrix allows to flexibly allocate the transmit symbols to the inputs of the ZF part of the precoder. Based on the block-diagonal structure of the MIMO feeder link channel matrix and provided that all its block-diagonal entries are invertible, the ZF condition that should be fulfilled by $B_{zf}$ is formulated as $$HB_{zf}=\text{diag}\{\sqrt{\mu^{(1)}} \cdot I_2, \ldots, \sqrt{\mu^{(K/2)}} \cdot I_2\}, \tag{16}$$

where $\mu^{(l)}$, $1 \leq l \leq K/2$, are non-negative numbers. The previous constraint guarantees that the two parallel subchannels that are available for each uplink carrier frequency have equal amplitude gains. The precoder $B_{zf}$ satisfying (16) is given by $$B_{zf}=\text{diag}\{B_{zf}^{(1)}, \ldots, B_{zf}^{(K/2)}\}=\text{diag}\{\sqrt{\beta^{(1)}} \cdot H^{(1)^+}, \ldots, \sqrt{\beta^{(K/2)}} \cdot H^{(K/2)^+}\}, \tag{17}$$

The matrix $H^{(l)^+}$ stands for the Moore-Penrose pseudo-inverse of $H^{(l)}$. If this latter matrix is invertible, its pseudo-inverse corresponds to its inverse $(H^{(l)})^{-1}$. It is resorted, however, to the pseudo-inverse solution to account for cases where $H^{(l)}$ is singular. It is noted that, when this case is encountered, $H^{(l)}H^{(l)^+}$ is not a diagonal matrix. The coefficients $\beta^{(l)}$ are normalization factors used to fulfill the power constraints from (7) with equality for at least one of the gateways. They are obtained as $$\beta^{(l)} = P_u^{(l)} \Big/ \max_n [H^{(l)^+}(H^{(l)^+})^H]_{n,n}. \tag{18}$$

With the ZF precoding solution, the power allocation in the gateways is influenced by the weather impairments. It can indeed be shown that $$[B^{(l)}B^{(l)H}]_{n,n} = \beta^{(l)}[H^{(l)^+}(H^{(l)^+})^H]_{n,n} = \min\left\{\left|\frac{\alpha_1}{\alpha_2}\right|^{2(-1)^n}, 1\right\} \cdot P_u^{(l)}. \tag{19}$$

This implies that, if gateway 1 (or 2) experiences better weather conditions than gateway 2 (or 1), i.e. $|\alpha_1|>|\alpha_2|$ (or $|\alpha_2|>|\alpha_1|$), it uses only $$\left|\frac{\alpha_2}{\alpha_1}\right|^2 \cdot 100\% \text{ (or } \left|\frac{\alpha_1}{\alpha_2}\right|^2 \cdot 100\%\text{)}$$

of its available power. The gateway with the worse attenuation, on the other hand, fully exploits its available power. Both gateways send with their maximum power level only if they experience equal rain attenuations.

In the satellite, the vector of receive symbols is multiplied with the matrix $W^H=\Pi^T$ to switch the symbols to their corresponding downlink beams. For an inverted MIMO feeder link channel, the input-output relationships of the K resulting parallel and independent subchannels are given by $$z_k=\sqrt{\varphi_k} \cdot s_k + \tilde{\eta}_{u,k}, 1 \leq k \leq K. \tag{20}$$

The coefficient $\varphi_k$ is the square of the k-th diagonal element of $\Pi^T HB_{zf}\Pi$ and $\tilde{\eta}_{u,k}$ is the k-th entry of the vector $\varnothing^T \eta_u$. For example, if the k-th symbol is allocated to one of the two subchannels available at the l-th carrier frequency, $\varphi_k=\mu^{(l)}$ applies.

MSE based designs: Whereas only an on-board switching of the symbols to the desired downlink beam was assumed in the previous description, approaches requiring a more advanced processing in the satellite are now envisioned. Here, optimization criteria relying on the minimization of mean squared error (MSE) based cost functions are considered for the joint design of the precoder B and the on-board processing matrix W. For this purpose, the MSEs between the sequences of symbols at the input of the precoder and at the output of the on-board processor are defined as $$MSE_k = \mathbb{E}[|z_k-s_l|^2]=w_k^H R_y w_k - 2\operatorname{Re}\{w_k^H Hb_k\}+1, \quad 1 \leq k \leq K. \tag{21}$$

It is recalled that $R_y=HBB^H H^H+I_K$ is the autocorrelation matrix of the vector of symbols at the input of the satellite payload. The MSEs from (21) are not convex in $(b_k, w_k)$ but become convex if one of the variables is known. This characteristic is exploited to find the global minima of MSE based functions subject to power constraints for the precoder. Expressions for optimal matrices B and W will indeed be determined separately assuming that the other parameter is fixed. If $q_0: \mathbb{R}^K \mathbb{R} \mapsto$ represents a MSE based cost function, the optimization problems are formulated in a unified framework as $$\min_{B,W} q_0(MSE_1, \ldots, MSE_K) \quad (22)$$

$$\text{s.t. } BB^H \leq \text{diag}\{P_u^{(1)} I_2, \ldots, P_u^{(K/2)} I_2\} = P.$$

The power constraint in (22) means that the matrix $BB^H - P$ must be positive semidefinite. It reduces the feasibility set compared to the initial constraint (7). However, it can be shown that an optimal precoding matrix for (22) is also optimal for the same problem solved under constraint. So far, the cost function is not expressed in closed-form. The only assumption that is made is that it should increase if one of the subchannel MSEs is set to a larger value. Relying on this property, it is observed that the optimization of the on-board processing matrix W for a known B is actually independent of the choice of the cost function. Indeed, as seen in (21), the k-th row of W only affects the k-th MSE value $MSE_k$. Therefore, a minimization of the sum of the subchannel MSEs guarantees that each term of this sum and, as a matter of fact, the cost function $q_0$ will be minimized. Here, the sum MSE is given by $$MSE_\Sigma = \sum_{k=1}^{K} MSE_k = \mathbb{E}[\|z-s\|_2^2] = Tr(W^H R_y W) - 2\text{Re}\{Tr(W^H HB)\} + K. \quad (23)$$

Taking the derivative of (23) with respect to $W^H$ and setting it to zero provides the optimal on-board processing matrix. It writes as $$W = R_y^{-1} HB = (HBB^H H^H + I_K)^{-1} HB. \quad (24)$$

Using (24) and the matrix inversion lemma, the subchannel MSEs can be rewritten as $$MSE_k = 1 - b_k^H H^H R_y^{-1} H b_k = \frac{1}{1 + b_k^H H^H \overline{R}_{y_k}^{-1} H b_k}, \quad (25)$$

where $\overline{R}_{y_k}$ is the autocorrelation matrix of the vector of symbols received by the satellite payload without the contribution of the k-th user symbol $s_k$, i.e. $\overline{R}_{y_k} = R_y - Hb_k b_k^H H^H$. With the result from (25), a relation between the CINRs at the output of the on-board processor and the subchannel MSEs can be established. In the following, the post-processing uplink is defined CINRs as $$CINR_{u,k} = \frac{|w_k^H H b_k|^2}{\sum_{h \neq k} |w_k^H H b_h|^2 + \|w_k\|_2^2} = \frac{|w_k^H H b_k|^2}{w_k^H \overline{R}_{y_k} w_k} = b_k^H H^H \overline{R}_{y_k}^{-1} H b_k, \quad (26)$$

$$1 \leq k \leq K.$$

The last expression in (26) is obtained by resorting to the Cauchy-Schwarz inequality and using the fact that the columns of the optimal on-board processing matrix verify $w_k \propto \overline{R}_{y_k}^{-1} H b_k$. Comparing (26) and (25), it becomes obvious that $$CINR_{u,k} = \frac{1}{MSE_k} - 1, \ 1 \leq k \leq K. \quad (27)$$

The previous relationship shows that an optimization problem aiming at a minimization of an MSE based function can be equivalently seen as an optimization problem where an uplink CINR based cost function should be maximized. For a given user k, the total CINR observed at the receiver equipment computes as $$CINR_{Tot,k} = \frac{CINR_{u,k} \cdot CNR_{d,k}}{CINR_{u,k} + CNR_{d,k} + 1}. \quad (28)$$

Influencing the value of the uplink post-processing CINRs has consequently a direct impact on the total CINRs. Here, two different CINR based cost functions are considered:
the product of the uplink CINRs
the minimum of the uplink CINRs
It will come out in the sequel that these cost functions differ in terms of fairness between the symbol sequences, hence representing two basic alternatives. They will be referred to as the MAX-PROD-UpCINR and the MAX-MIN-UpCINR schemes. To facilitate the formulation and the analysis of the solutions, two block-diagonal matrices $V \in \mathbb{C}^{K \times K}$ and $\Gamma \in \mathbb{R}^{K \times K}$ are first defined as $$V = \text{diag}\{V^{(1)}, \ldots, V^{(K/2)}\}, \Gamma = \text{diag}\{\Gamma^{(1)}, \ldots, \Gamma^{(K/2)}\}, \quad (29)$$

where $V^{(l)} \in \mathbb{C}^{2 \times 2}$ and $\Gamma^{(l)} \in \mathbb{R}^{2 \times 2}$, $1 \leq l \leq K/2$, are the matrices of eigenvectors and eigenvalues of $H^{(l)H} H^{(l)}$ such that $$H^{(l)H} H^{(l)} = V^{(l)} \Gamma^{(l)} V^{(l)H} = V^{(l)} \begin{bmatrix} \gamma_1^{(l)} & 0 \\ 0 & \gamma_2^{(l)} \end{bmatrix} V^{(l)H}. \quad (30)$$

The eigenvalues $\gamma_1^{(l)}$ and $\gamma_2^{(l)}$ correspond to the gains of the MIMO eigenmodes at frequency $f_c^{(l)}$. They are assumed to be sorted in descending order, i.e. $\gamma_1^{(l)} \geq \gamma_2^{(l)}$. When no rain attenuation impairs the signals, an antenna arrangement allowing a maximization of the data rate in $H^{(l)}$ is such that $\gamma_1^{(l)} = \gamma_2^{(l)}$. The MAX-PROD-UpCINR and MAX-MIN-UpCINR strategies are now presented in detail.

MAX-PROD-UpCINR: The problem of maximizing the product of the uplink CINRs is solved by defining the MSE based cost function $q_0$ as $$q_0(MSE_1, \ldots, MSE_K) = -\prod_{k=1}^{K} \left( \frac{1}{MSE_k} - 1 \right). \quad (31)$$

The problem is equivalent to a maximization of the geometric mean of the uplink CINRs or of the arithmetic mean of their values in dB. To find a closed-form solution, the assumption that all the MSEs in (31) are smaller than ½ is made. This is a reasonable hypothesis since the scenarios where it could potentially not be fulfilled are obtained for gateway antenna separations entailing weak eigenmode gains $\gamma_2^{(l)}$, $1 \leq l \leq K/2$. This is not desired in a practical system design. If the previous assumption is valid, a global minimum of the cost function is reached with a precoding matrix whose structure leads, together with the matrix W, to a diagonalization of the MIMO channel. For the proposed system, this solution writes as $$B = P^{1/2} V\Pi, \qquad (32)$$

where a flexible allocation of the symbols to the eigenmodes of the MIMO channel is allowed by the K×K permutation matrix Π. The diagonal matrix $P^{1/2}$ contains the square roots of the entries of P and guarantees that $BB^H = P$. It implies that the maximum available power at the gateways is used. A set of K parallel and independent subchannels may be obtained whose input-output relationships are $$z_k = \frac{\psi_k}{\psi_k + 1} s_k + \frac{\sqrt{\psi_k}}{\psi_k + 1} \tilde{\eta}_{u,k}, \; 1 \le k \le K, \qquad (33)$$

with $\tilde{\eta}_{u,k} = w_k^H \eta_u / \|w_k\|_2$, a unit variance circularly-symmetric complex Gaussian noise, and $\psi_k = \text{CINR}_{u,k}$, the k-th diagonal element of the matrix $\Pi^T P \Pi$. If the permutation matrix Π is such that the k-th symbol sequence is allocated to the i-th eigenmode at the l-th carrier frequency, the coefficient $\psi_k$ is equal to $P_u^{(l)} \cdot \gamma_i^{(l)}$. Hence, it is obvious that the MAX-PROD-UpCINR approach cannot ensure fairness between the symbol sequences in the MIMO feeder link as soon as the gains of the eigenmodes are not equal. This motivates the resort to the MAX-MIN-UpCINR scheme.

MAX-MIN-UpCINR: Using again the relation from (27), the minimum of the uplink CINRs is maximized by expressing in problem (22) the MSE based cost function as $$q_0(MSE_1, \ldots, MSE_K) = \max_k \{MSE_k\}. \qquad (34)$$

In this case, it can be shown that an optimum precoder consists in a rotation of the vector of transmit symbols followed by a diagonalization of the MIMO channel. A possible solution for the investigated feeder link is given by $$B = P^{1/2} V\Omega, \qquad (35)$$

where the matrix $P^{1/2}$ is defined as in (32), and the matrix $\Omega \in \mathbb{C}^{K \times K}$ is the unitary DFT matrix. A rotation of the vector of transmit symbols s with this matrix allows to equally spread the user symbols on all the eigenmodes of the feeder link. In this way, after the on-board processing with the matrix W, the same uplink CINR is achieved in all the subchannels. We finally note that the total available power in the gateways is also used with the MAX-MIN-UpCINR approach as it is easily verified that $BB^H = P$.

A smart diversity strategy is described in the following to maximize the availability of a multiple-input-multiple-output (MIMO)-based feeder link architecture. First, a diversity mode for the operation of a link affected by a heavy rain event at one of its antenna locations is introduced. A robust scheme for the exploitation of MIMO feeder links is then explained.

A feeder link can be operated in a diversity mode. The use of two antennas separated by a few kilometers to produce single-site diversity gains is actually a conventional approach. However, in the prior art, the antennas are never active at the same time. The antenna in idle state is activated only if the primary one experiences a heavy rain fade. Here, with the system architecture according to a preferred embodiment of the invention, the diversity mode will be used if rain attenuation at one gateway antenna is too strong to enable spatial multiplexing. Only the antenna with the smallest rain attenuation remains in this case operative and supports K/2 data sequences instead of K. The channel from the active gateway to the two satellite reflectors at the l-th uplink carrier frequency is $h_n^{(l)}$. It corresponds to the n-th column of the matrix $H^{(l)}$ where n is the index of the active gateway antenna. Given a symbol $x_l$ transmitted in the l-th frequency channel with a power $P_u^{(l)}$, the received symbols are given by $$y^{(l)} = h_n^{(l)} x_l + \eta^{(l)}, \qquad (36)$$

with $\eta^{(l)}$ the vector of realizations of an independent zero-mean circularly symmetric complex Gaussian noise of variance $P_\eta^{(l)}$. Maximum ratio combining (MRC) is applied in the on-board processor to maximize the diversity gain. The vector $y^{(l)}$ is multiplied with $\|h_n^{(l)}\|_2^{-2} \cdot h_n^{(l)H}$ such that the effective carrier to interference plus noise ratio (CINR) in the l-th frequency channel is $$\rho_{u,l} = \frac{P_u^{(l)}}{P_\eta^{(l)}} \cdot \|h_n^{(l)}\|_2^2 = |\alpha_n|^2 \cdot \tilde{\rho}_{u,l}. \qquad (37)$$

Again, $\tilde{\rho}_{u,l}$ stands for the effective CINR in clear-sky conditions. In the results section, the link budget will ensure that the same clear-sky CINR is achieved in all channels such that $\tilde{\rho}_{u,l} = \tilde{\rho}_u$.

The outage probability of the diversity mode is the probability that the rain attenuations at both gateway locations are too high to guarantee an effective CINR higher than the outage CINR $\rho_0$, i.e $$P\{\rho_u \le \rho_o\} = P(A_1 \ge A_{lb}, A_2 \ge A_{lb}), \text{ with} \qquad (38)$$

$$A_{lb} = \min\{A \mid 10^{-\frac{A}{10}} \cdot \tilde{\rho}_u \le \rho_o\}.$$

Based on the fact that the considered architecture can be used for spatial multiplexing or diversity purposes, a MIMO feeder link is seen as a set of two virtual transmitters supporting K/2 data sequences each. The principle and the outage probability of these transmitters is addressed in the following.

Virtual transmitter 1: It guarantees the transmission of K/2 data streams if the spatial multiplexing mode is not in outage. As soon as spatial multiplexing is not feasible anymore, this transmitter is in outage. To limit the power consumption in the satellite, a preferred approach to operate virtual transmitter 1 is to use ground-limited processing scheme as long as no outage is encountered with this approach. Else, a joint ground/on-board processing is activated.

Virtual transmitter 2: The K/2 streams allocated to this transmitter are supported, together with the streams of virtual transmitter 1, using spatial multiplexing if no outage is encountered. As soon as spatial multiplexing is not operational anymore, the streams are transferred to the diversity mode. Hence, the outage probability of virtual transmitter 2 is the probability defined in (39) that the diversity mode is in outage.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to ad-vantage. Any reference signs in the claims should not be construed as limiting the scope. Further, for the sake of clearness, not all elements in the drawings may have been sup-plied with reference signs.

The invention claimed is:

1. Method for operating a communication system, the communication system comprising at least two separate transmitting antennas located on Earth and at least two receive antennas located with a distance from Earth, the receive antennas having directional receiving patterns which cover a common region on Earth in which the at least two separate transmitting antennas are located, the method comprising:

precoding a number of symbol sequences before transmission from the transmitting antennas to the receive antennas in order to reduce spatial interference between the symbol sequences, simultaneously transmitting symbol sequences from the transmitting antennas to the receive antennas by spatial and frequency multiplexing in a time and phase synchronized fashion, where symbol sequences that differ from each other are transmitted on the same frequency by transmitting antennas that differ from each other;

generating a number of K independent symbol sequences such that for a given instant of time the symbols from all symbol sequences form a vector of length K; and processing the vector with a linear or non-linear technique and assigning the K independent symbol sequences to a specific transmitting antenna and to a specific uplink frequency channel of the respective transmitting antenna.

2. Method according to claim 1, further comprising:
converting the symbol sequences received by the receive antennas from a respective uplink frequency channel to a downlink frequency channel and forwarding the symbol sequences on the downlink frequency channel.

3. Method according to claim 1, further comprising:
processing the symbol sequences after receipt at the receive antennas in order to reduce spatial interference between the symbol sequences, and
converting the processed symbol sequences from a respective uplink frequency channel to a downlink frequency channel and forwarding the symbol sequences on the downlink frequency channel.

4. Method according to claim 1, further comprising:
forwarding the symbol sequences from the receive antennas to multiple ground receivers on Earth.

5. Method according to claim 4, wherein the ground receiver are not connected with each other.

6. Method according to claim 4, wherein at least a part of the ground receivers forms a MIMO system.

7. Method according to claim 6, wherein multiple MIMO systems are formed which are separate from each other.

8. Method according to claim 1, further comprising:
processing the vector such that the source symbols are distributed among all uplink frequency channels of the transmitting antennas.

9. Method according to claim 1, wherein the transmit antennas are inter-connected with each other via a central processing unit which supervises the generation of the symbol sequences which are to be transmitted to the receive antennas.

10. Method according to claim 1, wherein the receive antennas are satellite based, and based on at least one satellite in space and based on a single satellite in space.

11. Method according to claim 10, wherein the receive antennas are provided on multiple collocated satellites.

12. Method according to claim 1, wherein the receive antennas are located on one high-altitude platform or multiple high-altitude platforms.

13. Method according to claim 1, wherein the transmitting antennas are located on earth on a respective fixed position, the fixed positions being separated from each other by a distance of at least 10 km.

14. Method according to claim 1, further comprising:
precoding the symbol sequences before transmission from the transmitting antennas to the receive antennas in order to improve robustness against atmospheric impairments.

15. Method according to claim 1, further comprising:
deactivating a transmit antenna when it suffers from a too strong rain fade attenuation.

* * * * *